March 7, 1939.

A. J. BOCZ

Re. 21,021

VIBRATION DAMPER

Original Filed July 30, 1927 3 Sheets-Sheet 1

INVENTOR.
Alexander J. Bocz.

March 7, 1939. A. J. BOCZ Re. 21,021

VIBRATION DAMPER

Original Filed July 30, 1927 3 Sheets-Sheet 2

INVENTOR.
Alexander J. Bocz

March 7, 1939. A. J. BOCZ Re. 21,021

VIBRATION DAMPER

Original Filed July 30, 1927 3 Sheets-Sheet 3

INVENTOR.
Alexander J. Bocz

Reissued Mar. 7, 1939

Re. 21,021

UNITED STATES PATENT OFFICE 21,021

VIBRATION DAMPER

Alexander J. Bocz, Detroit, Mich.

Original No. 1,886,246, dated November 1, 1932, Serial No. 209,460, July 30, 1927. Application for reissue June 14, 1937, Serial No. 148,192

4 Claims. (Cl. 74—574)

My invention relates to a new and useful balancer and silencer for engines, machines, apparatuses, etc. and is attached to a rotating part, where the vibrating force or forces exist.

It is an object of the present invention to provide a device which counteracts the unbalanced force or forces set up in a revolving part or shaft and to overcome the out of balance of the revolving part or shaft thus eliminating any vibration, whether due to out of balance or to the uneven forces delivered thereto or the resonance vibration; the so-called critical speed of vibration.

The vibration, resulting from unbalanced forces, for instance, in an internal combustion engine used for driving automobiles and other vehicles, it is most desirable to reduce said vibrations to a minimum to permit the building of light, cheap and durable cars, also for other industrial purposes, and also to prolong life, cheapen manufacturing and reduce operating noise of machines, apparatuses, etc. The various forces, which cause the objectionable vibrations on the shaft or in a revolving body are described in my Patent 1,756,898 and my Canadian Patents #286,909, #290,681 and 302,883.

The present invention provides a simple and sensitive means, which is effective in counterbalancing all the unbalanced forces as well as dampening all the vibrations. The forces described in my patents are counterbalanced by my devices as illustrated therein, and the present invention has the advantage of being simple in structure, and is mounted on or between yieldable or elastic means; whose natural vibrations are thus eliminated or reduced. My devices also embody the element-controlled means, with which element the patent to Wilcox 312,780, and patents to Morgan 379,022 and 427,103 will function at any speed or all direction of vibrations.

The vibrationless mounting of my device concentrates almost all the forces on or between said controlled means, to which the flexible or yieldable disc or spokes are secured, on which disc or spokes the balancing mass or masses are concentrically arranged, and during operation the entire mass of my device assumes its center line due to the flexible or elastic mounting.

The various modifications are shown with the adaptations of my natural vibrationless flexible means. With these means I use my invention in the accompanying drawings, which form a part of this specification and in which, Fig. 1 is a front elevation view of one form of the invention.

Figure 1:
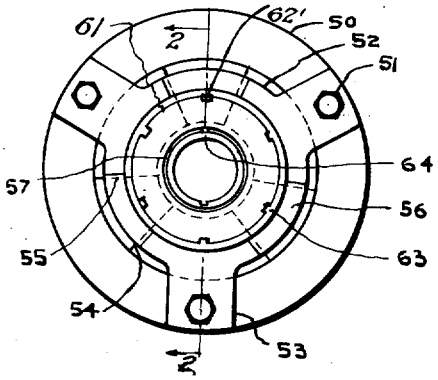

In Fig. 1 is a flywheel comprising an annular rim 50, secured by suitable bolts 51 passed therethrough to the faces of said rim 50, the retainer 52, having the tongues 53, radiating outwardly therefrom. These retainers are adapted to engage firmly the segments 54, which are made of soft or medium rubber or cork, etc.

These retainers are alternately offset as at 55 and provided with pocket 56, in which the segments 54 are secured to limit the flow of said rubber. The rim 50, segments 54 and the retainers 52 are assembled together.

The device is mounted to a revolving part on or between flexible means, or there is provided a sleeve 57 which may be keyed to said part and threaded on its periphery. This sleeve has at one end 58 a tapered face on its inner side. A nut 59 is adapted for threading on the sleeve 57; this nut is also provided with a beveled inner face 60. The said segments, retainers and ring are assembled and positioned on the sleeve in the manner shown in Fig. 2; a threading of the nut 59 will effect a clamping of said segments. This arrangement forces the segments firmly to engage radially the inner surface of said rim, and the flow of the rubber is limited in all directions in said pockets.

A lock nut 61 is threaded on the sleeve 57 and serves to lock the nut 59 in its position. I have also provided a lock 62 which has a portion 62' angularly turned to engage notches 63 formed in the lock nut 61 and which also has an inwardly projected tongue 64 to engage in grooves 65 formed in the sleeve 57.

In operation the rim 50 tends to stay in its plane of revolution, then the torque reaction tends to displace the centerline of the revolving part, either through whipping, twisting or bending the shaft or in any other way striving to move the device out of its plane of revolution. Since the rim is connected with yieldable connections, and said connections are attached to said shaft by yieldable means or by said sleeve, said segments respond to any or all forces, and the inertia of the rim 50 will oppose and neutralize said forces.

The assembled device is a flexible flywheel, whose spokes are said segments, and the rim is mounted concentrically thereon, and the center portion of said segments either is secured by yieldable mounted means or said sleeve is attached to the revolving shaft or body. The inertia of the rim always resists any forces delivered to said segments or any displacement of the centerline of the revolving shaft or part to which it is attached.

This same arrangement is maintained through the various modifications which I have shown and illustrated in the drawings, and in those particular instances in which some special operation of the device is effected, attention will be directed thereto.

Figure 3:
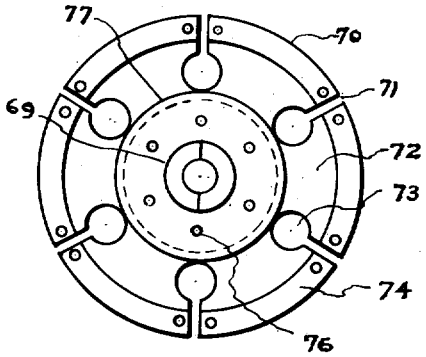
Fig. 3 is a front elevation view of a modified form of the invention applied to the front end of a crankshaft.
Figure 4:
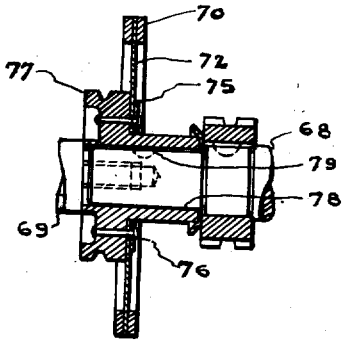
Fig. 4 is a side elevational view of the form shown in Fig. 3 in section.

In Figs. 3 and 4 I have illustrated a modified form of my invention incorporated in a crankshaft. The balancing device is mounted on the front end of the crankshaft 68 and held in place by the starting jaw nut 69, comprising; a flywheel 70 having slits 71 in the web 72 to increase the flexibility of the web of said flywheel, and circular holes 73 are provided, so that the flexibility of said web is further increased and the parts of the rim 74 are secured to the outer edge of said web.

In Fig. 4 is shown the center portion of said web secured by a collar 75 and bolts, rivets or other means 76, to the fan pulley 77, which has an extending sleeve 78 provided with a key 79, for fastening to the crankshaft 68, or said web can be mounted on or between elastic means to said shaft.

In this structure, the web of said flywheel is the flexible spokes, to which the parts of said rim are attached, and during operation of this device, the inertia parts of said rim always resist the axial and radial displacements of the centerline of the revolving crankshaft, due to the flexibility of said web.

Figure 5:
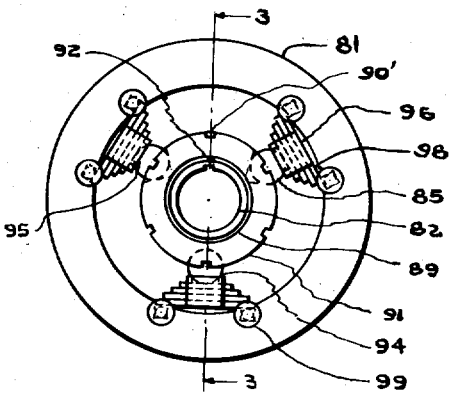
Fig. 5 is a front elevation view of another modified form of the invention.
Figure 6:
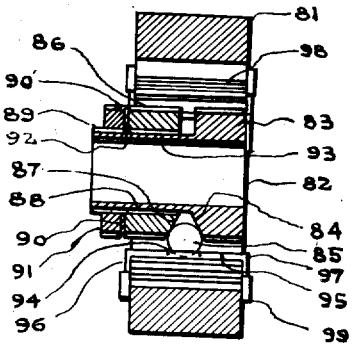
Fig. 6 is a section view taken on line, 3—3, of Fig. 5.

In the structure shown in Figs. 5 and 6, the flexible flywheel comprises, a rim 81 having a hub or sleeve 82 and at one end a flange 83 and the inside of the said flange provides pocket 84, in which the balls 85 are secured with a ring 86, which has also pockets 87, and the center portion of the ring 86 is provided with a hole 88 to slip over the threaded end of the hub 89, a lock washer 90 has portions 90' turned to engage the notches in the lock nut 91, and it has an inwardly projecting tongue 92 to connect a groove 93 formed in the hub 82. The balls 85 engage in an opening 94 formed in the saddle 95, the legs 96 and 97 of which embrace the spring leaves 98 through which bolts or notches are provided for securing the same to the saddle 95. The ends of the longest leaf of said springs engage the pins 99 which are secured on the rim 81. Turning the nut 91 on the threaded end of the sleeve 89 will force the balls 85 to clamp the springs 98 firmly with the pins 99; the rim 81, and the sleeve 82 are now in an assembled position. Then the portion 90' is turned into one of the notches of the lock nut 91 preventing disengagement.

Figure 2:
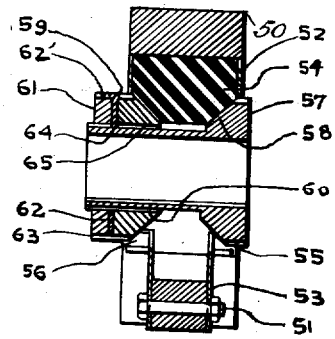
Fig. 2 is a sectional view taken on line, 2—2, of Fig. 1.

The assembled balancing device is a resilient flywheel, whose spokes are said springs, the center portion of said springs being secured by yieldable means to dampen and silence the resonance vibrations; or said sleeve is attached to the revolving shaft or body, and this device will function exactly as described in Figs. 1 and 2.

Figure 7:
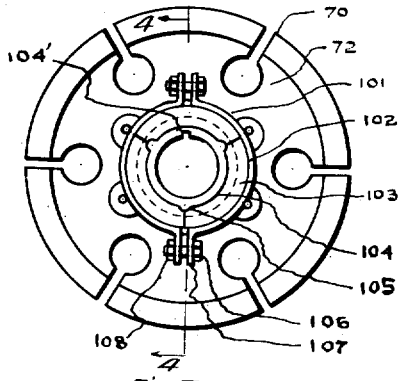
Fig. 7 is a front elevational view of another modified form of the invention.
Figure 8:
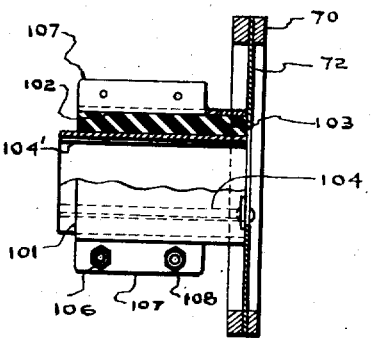
Fig. 8 is a view taken on line, 4—4, of Fig. 7.

In Figs 7 and 8 I have illustrated a type of the balancing device 70 already described in Figs. 3 and 4 and now the flexible web 72 is attached to a tubular clamp 101, and inside of the tubular clamp 102 is lined with yieldable material blocks 103, whose flow is limited by said clamp, they being slipped over the hub or sleeve 104, said sleeve having ribs 105 to insure a permanent position for said blocks and tubular clamp on the sleeve 104. The bolts 106 are projected through the lugs 107, which are formed on the said clamp, and the nuts 108 are turned to set the required tension for clamping the yieldable blocks 103 to the sleeve 104; thus the flow of the rubber is limited through this arrangement. The said sleeve has a key-way 104' for attaching to a shaft.

By mounting the flexible device on yieldable means the resonance vibrations are diminished, and less weight is required to balance vibrations because the vibrating forces are concentrated on or to the yieldable blocks 103, whose flow is limited and whose mean radius is smaller than the mean radius of the assembled flexible flywheel. Thus all the resonance vibrations are eliminated, and any or all vibrating forces are concentrated to its plane of revolution of this device, and the said forces are opposed or neutralized or dampened or resisted by the inertia of this device.

Figure 9:
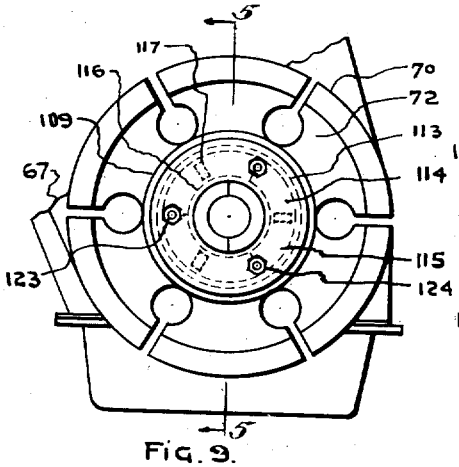
Fig. 9 is a front elevational view of an engine in fragment, and another form of the invention is applied thereto.
Figure 10:
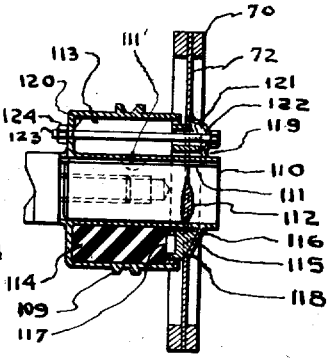
Fig. 10 is a fragmentary view taken on line, 5—5, of Fig. 9.

In Figs. 9 and 10 I have illustrated an internal combustion engine having a timer housing 67. The selected flywheel is described in Figs. 3 and 4, to it any balancing or dampening device can be applied to concentrate the mass of said device to a yieldable mounting on a revolving shaft or a body.

A fan pulley 109 is provided with a sleeve 110 and it has a key-way 111 to secure said sleeve to the crankshaft 112 by a key 111'.

The hole 113 is filled with yieldable blocks 114. A convex collar 115 is smaller than said hole so that the flow of the yieldable blocks is limited in said hole, and said collar has a large center opening 116 through which the sleeve 110 is projected. The collar 115 is provided with grooves in which the rollers 117 are placed, and they partly project into the blocks 114.

The center portion of the web has a large hole 119, and a portion 118 which portion partly embraces the surface of the said convex collar. In Fig. 10 the fan pulley 109 has holes 120. The web 72 has bosses 121, in which the holes 122 are larger than the bolts 123, which bolts project therethrough between the blocks 114, thus the natural vibration of said bolts are prevented. The nuts 124 and bolts 123 hold the device in an assembled position, which is shown in Fig. 10.

The assembled device requires less weight to overcome or balance the unbalanced forces in any revolving part, because the mass of this device is concentrated to the mean diameter of said yieldable blocks, whose diameter is smaller than the mean diameter of the flexible web 72; whose natural vibration are reduced through the use of the portion 119, and thus this structure will be more sensitive for action than my previous balancers and silencers or dampeners.

The mass of the device is displaceable axially and radially due to the yieldability of said blocks, and circumferentially due to the rollers 117, and universally due to the convexity of the collar. Of course any or all the combined movements of this device are limited by yieldable means and said movements always oppose any vibrations regardless of their directions.

The yieldable blocks 114 are enclosed in a space to limit the flow of said material in any direction and thus the yieldability of said material is preserved for the life of this device.

Figure 11:
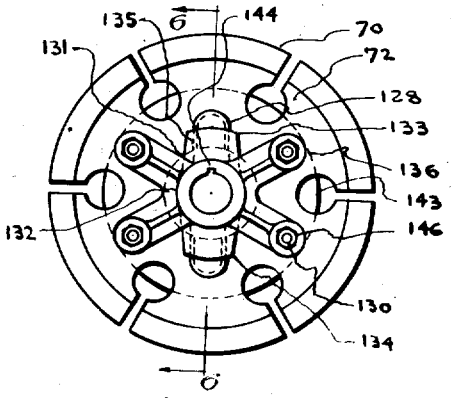
Fig. 11 is a front elevational view of a further modified form of the invention.
Figure 12:
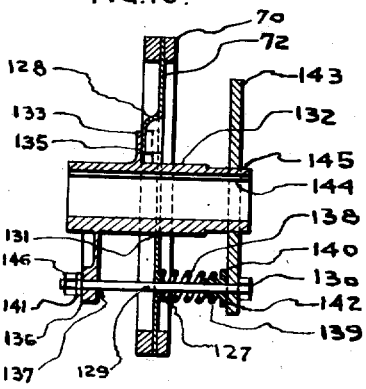
Fig. 12 is a section view on line, 6—6, of Fig. 11.

In Figs. 11 and 12 is a further modified form of my invention. The web of the flexible flywheel 70 is altered to suit the flexible mounting, whose natural vibrations are being controlled; this is shown in Fig. 12.

The web 72 has bosses 127 and beads 128 to minimize the natural vibrations of said web, the bosses having large holes 129 for projecting the bolts 130 therethrough. The center portion of said web has a large hole 131 through which the sleeve 132 passes. The sleeve 132 has a pair of lugs 133 and 134, each of which has its inner face formed with a convex portion 135, which accommodates the beads 128. The arms 136 radiate outwardly from the sleeve and the bolts 130 are projected through the holes 137 in said arms.

One end of each of the springs 138 engage the bosses 127 and the other ends 139 of said springs engage the bushing 140 in order to guide and to square said springs against deflection; to increase the resistance of said springs some yieldable material can be inserted in their cores and the natural vibrations of said springs will be prevented. Each of said bushings is provided with a hole, through which the bolts 130 are slipped, and a flange 142 insures a good bearing surface on a collar 143, which has holes for the bolts 130; its center also has a larger hole 145 for pressing the same on the sleeve 132.

The ends of the said bolts have nuts 146 and lock washers 141 to adjust the proper tension on said springs. The parts are assembled with the flexible flywheel 70, and the sleeve 132 has a key-way 144 through which this device is attached to any revolving part.

The rim or sections, which are attached to said flexible web will balance the same vibrating forces as described in Figs. 3 and 4; and the mass of said flywheel will overcome the vibrations of the other end of said shaft through the use of the natural vibrationless resilient mounting.

The difference between the mean diameters of the mounting and the device permits the building of a lighter and much more sensitive device.

Figure 13:
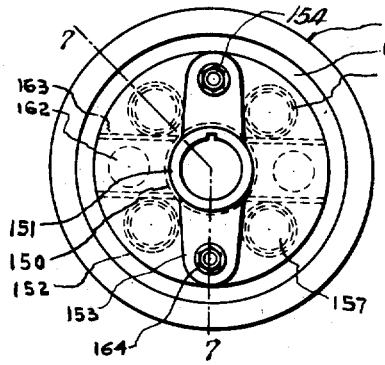
Fig. 13 is a front elevation view of a further modified form of the invention.
Figure 14:
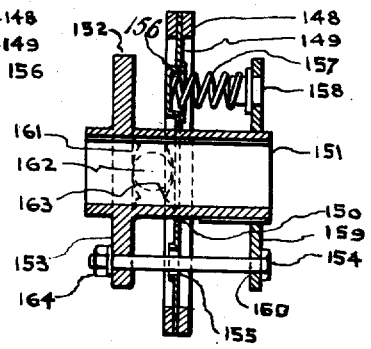
Fig. 14 is a sectional view taken on line, 7—7, of Fig. 13.

In Figs. 13 and 14 is shown a different type of my invention, and its mounting is shown in Fig. 14. The rim 148 is formed integral with the flexible web 149. This web contains several openings; the center opening 150 is larger than the diameter of the sleeve 151, which sleeve has a flange 152 and bosses 153. They are provided with holes for the bolts 154. The holes 155 are larger in the web than the diameter of said bolts.

A cup 156 is pressed into each of the openings of said web; in these cups one end of the springs 157 is secured against any displacement; the other end of said springs is located and guided squared by pins 158, which are pressed into a collar 159 which collar has holes 160 for the bolts 154, and said collar is slidable on the outer diameter of said sleeve and a key is used to prevent turning on the sleeve 151.

By this method the springs are guided and squared against deflection and the center of said springs are cored with yieldable material to prevent the natural vibrations of said springs.

The inner surface of said flange is provided with pockets 161 to locate the balls 162; they are engaged by projections 163 which are formed on the web 149.

The nuts 164 are turned to adjust the proper tension on the springs 157 and the device is assembled and shown in Fig. 14.

The sleeve 151 is provided with a key-way to fasten the device on a shaft or body.

During operation the mass of this device is capable of moving axially, radially and circumferentially; the weight of the rim takes care of only the movement for which it was built.

Figure 15:
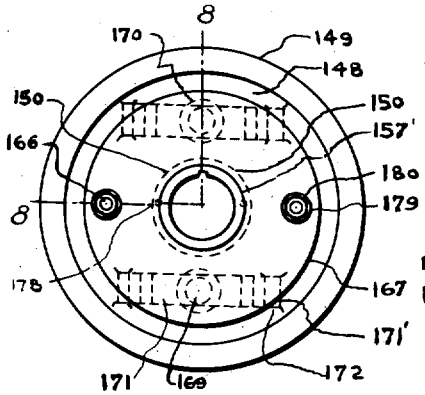
Fig. 15 is a front elevational view of a further modified form of my invention.
Figure 16:
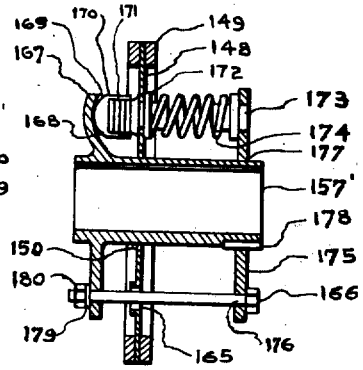
Fig. 16 is a sectional view taken on line, 8—8, of Fig. 15.

In Figs. 15 and 16 is shown an entirely different type of my invention and the flexible flywheel is mounted between natural vibrationless flexible means as shown in Fig. 16.

The rim 149 is formed in one piece with the flexible web 148. This web contains several holes; the center hole 150 is larger than the diameter of the sleeve 157′ the small holes 165 are larger than the diameter of the bolts 166.

The inside of the flange 167 is provided with grooves 168 to engage the semi-ball ends of the saddle 169 and they have arms 170 to embrace the leaves of the springs 171 and they are kept together by any means.

The longer ends of the leaf springs 171′ are located on projections 172 formed on said web. The guiding and squaring pins 172 are pressed into the other side of said web, on which pins one end of each of the coil springs 174 is mounted, and their natural vibrations are prevented as previously described. The other end of each of said springs is located on the squaring and guiding pins 173, which are pressed into a collar 175 and said collar has holes 176 for the bolts 166 and the center portion 177 of said collars fits on the sleeve, which has key 178 to prevent the collar 175 from turning thereon.

Another way is shown i. e. how to guide the springs against deflection by coring with soft yieldable material to keep the end of the springs square with the centerline so that the natural vibrations of said springs are prevented, and their resistance is greatly increased.

The washers 179 and nuts 180 are on the bolts 176 as shown in Fig. 16 and by turning said nuts the proper tension is put on said flexible means. The assembled device can be attached to a revolving part to overcome all vibrations therein, whereby the inertia of the device is used, which inertia mass is concentrated to a mean diameter of natural vibrationless resilient means, whose mean diameter is smaller than the mean diameter of said flexible flywheel; for this reason the device is much lighter in weight.

During operation the flexible mounting and the inertia of the device co-operate for counter-balancing all the unbalanced forces, which is already described in Figs. 1 and 2.

Figure 17:
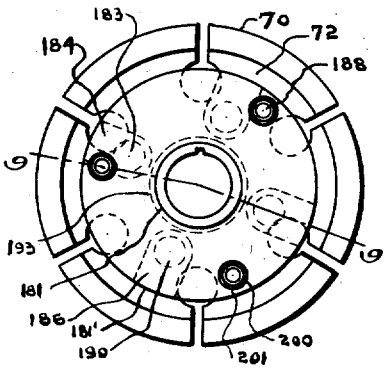
Fig. 17 is a front elevation view of another form of the invention.
Figure 18:
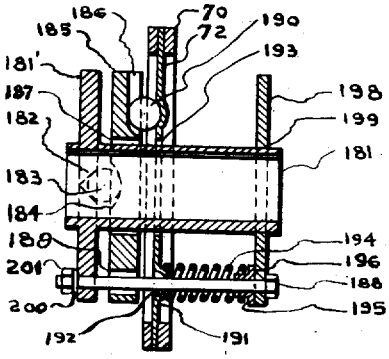
Fig. 18 is a sectional view taken on line, 9—9, of Fig. 17.

In Figs. 17 and 18 I have shown a sectional balancing device with a different method of mounting the inertia masses on or between flexible means.

The hub or sleeve 181 has a flange 181' in the face of which are pockets 182, in which the balls 183 are seated and said balls engage the grooves 184 in a displaceable spacer 185 and the opposite side of said spacer is also provided with grooves 186. In the center part of said spacer is a large hole 187 through which the sleeve projects. The bolts 188 pass through large holes 189 in said spacer.

The balls 190 are engaged in the grooves 186 and are fastened in the flexible web 72. The center of this web has a large hole 193 through which the sleeve 181 is projected and the bosses 191 have larger holes 192 than the diameter of the bolts 188 which holes permit a play therebetween.

One end of each of the springs 193 located on said bosses and the other ends of said springs 194 are inserted in bushings 195 and each of said bushings is provided with a hole and flange 196; said flanges are connected to a collar 198, which collar has a large hole 199 to provide a clearance for the sleeve 181, and also holes are provided for said bolts in said collar.

The bolts 188 have lock washers 200 and nuts 201 at the ends thereof, and turning the nuts on the bolts puts the necessary tension on the natural-vibration-less spring 193, which method has been previously described.

During the operation the inertia masses of this device are variable, because the spacer has movements independent of the flexible flywheel, which movements will displace the revolving centerline axially and radially of this device for counter-balancing the unbalanced forces; or the inertia masses of this device can be mounted on or between elastic means to a revolving shaft or body to eliminate all the resonance vibrations therewith as well as any or all vibrations in a revolving part because all the sectional inertia masses have independent axial and radial movements from each other.

Each of the various forms of my invention illustrated are believed to be practical and new as simple methods are used for overcoming the unbalanced forces and out-of-balance of any revolving part, and the resonance vibrations, which may exist in any revolving part of an engine, machine, etc., where it is desirable to reduce such vibrations.

In the claims it will be noted that forces are exerted by a revolving part. These are due to the unbalanced forces in the shaft or part, and such forces are eliminated or minimized or dampened under the combined influence of a rotating yieldable or flexible mounting and flexible connections or a flexible disc, whose natural vibrations are reduced or dampened, or whose flow is limited; to which flexible or yieldable means, the balancing weight or weights are secured.

I do not wish to limit myself to the precise details of the structure shown but desire to avail myself of such variations and modification as may come within the scope of the appended claims.

Having thus described my invention what I claim as new and desire to secure by Letters Patent is:

1. A vibration damper for a shaft comprising an inner sleeve member adapted to be secured to said shaft, resilient means surrounding said sleeve, an outer sleeve supported by and limiting the flow of said resilient means, and a flywheel structure attached to said outer sleeve, said structure consisting of a segmental inertia ring and flexible radial sections supporting the segments of said ring for axial movement relative to each other and to said outer sleeve.

2. A vibration damper for a shaft comprising an inner sleeve member adapted to be secured to said shaft, resilient means surrounding said sleeve, an outer sleeve supported by and limiting the flow of said resilient means, and a flywheel structure attached to said outer sleeve, said structure consisting of a segmental inertia ring and flexible radial sections supporting the segments of said ring for axial movement relative to each other and to said outer sleeve, said controlled resilient means limiting any displacement of said flywheel structure.

3. A vibration damper for a shaft comprising an inner sleeve member adapted to be secured to said shaft, resilient means surrounding said sleeve, an outer sleeve supported by and limiting the flow of said resilient means, and a divided flexible disc of a flywheel structure attached to said outer sleeve to dampen the natural vibration of said flexible disc, and said structure consisting of an inertia ring and said flexible disc supporting said ring for axial movement relative to said outer sleeve.

4. A vibration damper for a shaft comprising an inner sleeve member adapted to be secured to said shaft, resilient means surrounding said sleeve, an outer sleeve supported by and limiting the flow of said resilient means, and a divided flexible disc of a flywheel structure attached to said outer sleeve to dampen the natural vibration of said flexible disc, and said structure consisting of inertia rings and said flexible disc supporting said rings for axial movement relative to said outer sleeve, said controlled resilient means limiting any displacement of said flexible flywheel structure.

ALEXANDER J. BOCZ.